United States Patent
Iso et al.

(10) Patent No.: US 6,329,326 B1
(45) Date of Patent: Dec. 11, 2001

(54) ROLLING BEARING

(75) Inventors: Kenichi Iso; Atsushi Yokouchi; Hideki Koizumi; Kenji Okuma; Yasuhiro Hirayama, all of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/406,806

(22) Filed: Sep. 28, 1999

(30) Foreign Application Priority Data

Oct. 14, 1998 (JP) .................................................. 10-292340

(51) Int. Cl.[7] ........................ C10M 169/02; F16C 33/66
(52) U.S. Cl. ........................ 508/182; 508/582; 384/462; 384/463
(58) Field of Search .................... 508/579, 181, 508/182

(56) References Cited

U.S. PATENT DOCUMENTS

| | | | |
|---|---|---|---|
| 3,370,899 | * | 2/1968 | Eklund ................................. 308/193 |
| 4,472,290 | * | 9/1984 | Caporiccio et al. ............ 252/51.5 R |
| 4,757,145 | * | 7/1988 | Caporiccio et al. .................... 546/81 |
| 4,941,987 | * | 7/1990 | Strepparola et al. .................. 252/58 |
| 4,985,161 | * | 1/1991 | Tohzuka et al. ...................... 508/182 |
| 5,501,530 | * | 3/1996 | Nagai et al. ......................... 384/516 |
| 5,840,666 | * | 11/1998 | Yokouchi et al. .................... 508/107 |
| 5,904,426 | * | 5/1999 | Tsuru et al. .......................... 384/462 |
| 5,939,363 | * | 8/1999 | Toyota et al. ........................ 508/106 |
| 6,025,307 | * | 2/2000 | Chittofrati et al. .................. 508/182 |
| 6,040,277 | * | 3/2000 | Caporiccio .......................... 508/155 |
| 6,121,208 | * | 9/2000 | Toyota ................................. 508/106 |

FOREIGN PATENT DOCUMENTS

94/24223  10/1994  (WO) .............................. C09K/5/00

* cited by examiner

Primary Examiner—Ellen M. McAvoy
(74) Attorney, Agent, or Firm—Sughrue, Mion, Zinn, Macpeak & Seas, PLLC

(57) ABSTRACT

A rolling bearing has a grease filled therein. The grease contains a perfluoropolyether oil having a straight-chain structure having a dynamic viscosity of from 40 to 160 mm$^2$/s, preferably from 40 to 100 mm$^2$/s, at 40° C. as a base oil and a particulate fluororesin as a base oil, and a particulate polytetrafluoroethylene as a thickening agent.

8 Claims, 2 Drawing Sheets

DYNAMIC VISCOSITY AT 40°C OF PERFLUOROPOLYETHER OIL HAVING STRAIGHT – CHAIN STRUCTURE ( mm²/ s )

— LOW TEMPERATURE TORQUE
- - - - HIGH TEMPERATURE DURABILITY

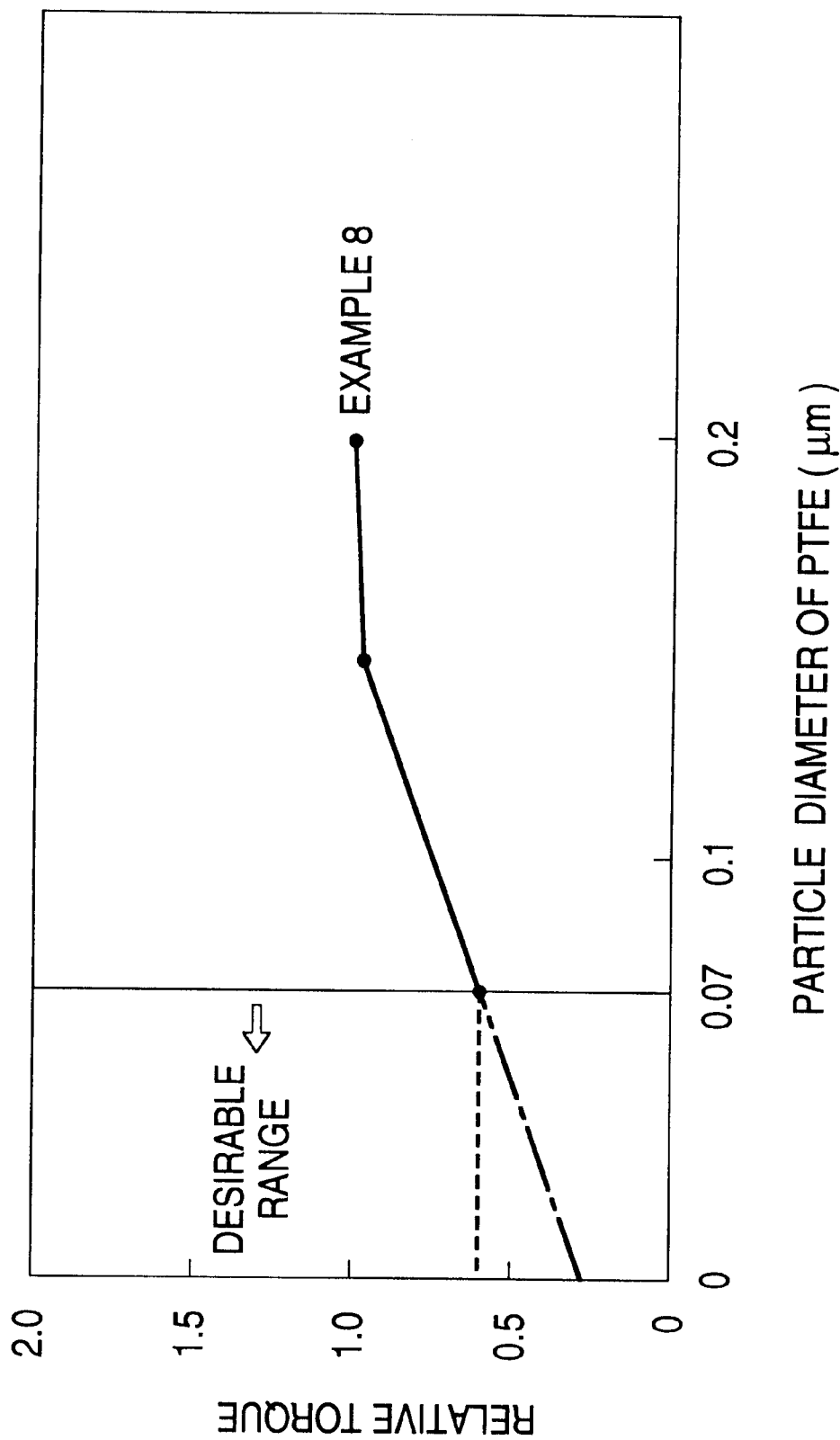

ROLLING BEARING

BACKGROUND OF THE INVENTION

1. Field of the Invention

The present invention relates to a rolling bearing for use in automobile fuel jet controller, particularly apparatus for controlling the speed or idle rotation, exhaust gas recycling apparatus, electronic throttle controller, etc. More particularly, the present invention relates to a rolling bearing for fuel jet controller having improved low temperature torque properties and high temperature durability.

2. Description of the Related Art

Rolling bearings for use in automobile fuel jet controller such as apparatus for controlling the speed of idle rotation, exhaust gas recycling apparatus and electronic throttle controller are often required to exhibit a good durability at high temperatures and good torque properties at low temperatures. To this end, high temperature durability or low temperature torque properties have been heretofore attained by filling a lithium soap-ester oil-based grease or urea-synthetic hydrocarbon oil-based grease in the rolling bearing as a lubricant which uses a synthetic oil as a base oil. Low temperature torque properties, if particularly demanded, have been attained by the use of a lubricant such as ester oil and fluorine-based oil.

In recent years, however, the requirements for the performance of rolling bearings for use in these fuel jet controllers have been severer. For example, an exhaust gas recycling apparatus is intended to recycle exhaust gas which has been just emitted to further reduce the amount of NOx in the engine exhaust gas. Thus, the rolling bearing used in the exhaust gas recycling apparatus is exposed to temperatures as high as close to 200° C. Accordingly, lubricants which have heretofore been filled in these apparatus such as lithium soap-ester oil-based grease, urea-synthetic hydrocarbon-based grease, ester oil and fluorine-based oil cannot maintain high temperature durability.

As mentioned above, the grease or lubricant filled in the conventional rolling bearings for use in automobile fuel jet controller, particularly apparatus for controlling the speed or idle rotation, exhaust gas recycling apparatus, electronic throttle controller, etc. exhibits a limited high temperature durability while satisfying its desired low temperature torque properties. Thus, the conventional grease or lubricant cannot exhibit further improvement in high temperature durability. Further improvement has been desired in low temperature torque properties.

SUMMARY OF THE INVENTION

It is an object of the present invention to provide a rolling bearing having better low temperature torque properties and high temperature durability than ever particularly suitable for automobile fuel jet controller.

The present invention has been worked out as a result of extensive studies of solution to the foregoing problems. In order to satisfy the requirements for torque properties and durability between low temperature (about −40° C.) and high temperature (about 200° C.), the present invention provides a rolling bearing comprising a grease filled therein, said grease comprising a perfluoropolyether oil having a straight-chain structure having a dynamic viscosity of from 40 to 160 mm$^2$/s at 40° C. as a base oil and a particulate fluororesin as a thickening agent.

In the foregoing description, the perfluoropolyether oil having a straight-chain structure which acts as a base oil exhibits a better heat resistance than that having a branched structure and thus exhibits a sufficient heat resistance at temperatures as high as higher than 200° C. The perfluoropolyether oil exhibits a high viscosity index and thus is little subject to thermal change in viscosity. Further, since the perfluoropolyether oil exhibits a dynamic viscosity of from 40 to 160 mm$^2$/s at 40° C., it can contribute to improvement in torque properties at low temperatures. The particulate fluororesin which acts as a thickening agent, too, exhibits a good heat resistance.

Accordingly, the filling of the foregoing specific grease makes it possible for rolling bearing to maintain good bearing properties between low temperature and high temperature over an extended period of time.

BRIEF DESCRIPTION OF THE DRAWINGS

In the accompanying drawings:

FIG. 3 is a graph illustrating the results of low temperature torque test.

DETAILED DESCRIPTION OF THE INVENTION

Figure 1:
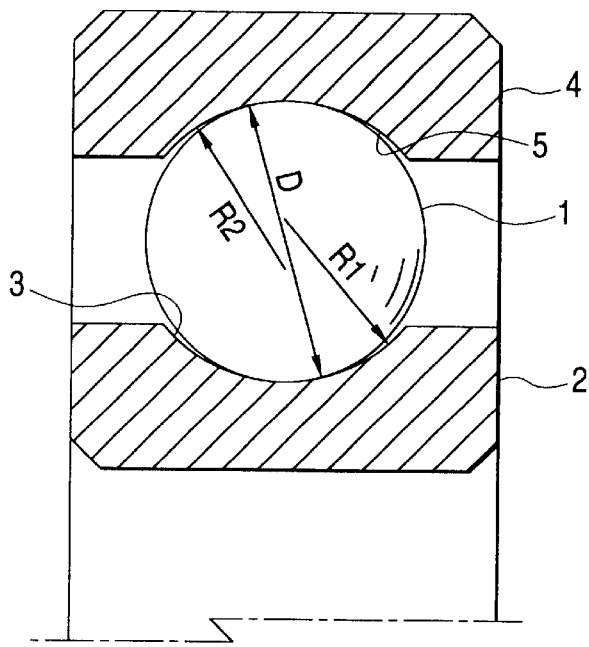
FIG. 1 is a diagram illustrating the radius of curvature of the groove on the inner and outer rings.

The present invention will be further described hereinafter with reference to the accompanying drawings.

The rolling bearing according to the present invention has a grease described in detail below filled therein.

The base oil to be used herein is not specifically limited so far as it is a perfluoropolyether oil having a straight-chain structure. Preferred examples of perfluoropolyether oil employable herein include those represented by the following general formulae (1) to (3):

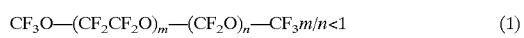
$$CF_3O-(CF_2CF_2O)_m-(CF_2O)_n-CF_3 \quad m/n<1 \quad (1)$$

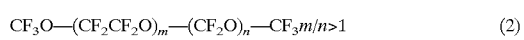
$$CF_3O-(CF_2CF_2O)_m-(CF_2O)_n-CF_3 \quad m/n>1 \quad (2)$$

$$F-(CF_2CF_2CF_2O)_n-CF_2CF_3 \quad (3)$$

Taking into account the torque properties at low temperatures, the perfluoropolyether oil preferably exhibits a dynamic viscosity of not more than 160 m$^2$/s, particularly not more than 100 mm$^2$/s at 40° C. On the other hand, from the standpoint of high temperature durability, the perfluoropolyether oil preferably exhibits a dynamic viscosity of not less than 40 mm$^2$/s at 40° C.

These perfluoropolyether oils having a straight-chain structure may be used singly or in admixture.

As the thickening agent, there is preferably used a particulate fluororesin having a high affinity for the foregoing perfluoropolyether oil having a straight-chain structure and high temperature stability, chemical resistance and acid resistance. For example, a particulate material made of tetrafluoroethylene-hexafluoropropylene copolymer (FEP), polytetrafluoroethylene (PTFE) or the like may be used; particularly preferred among these particulate materials is particulate PTFE.

The greater the diameter of particulate PTFE is, the greater is the resulting torque and the more easily can occur the torque rise at low temperatures. Thus, a particulate PTFE having an average particle diameter of not more than 0.1 μm is desirable. The shape of particulate PTFE is not specifically limited so far as the desired particle diameter is satisfied. It may be spherical or polyhedral (cubic or parallelopipedic), acicular in extreme case.

Such a thickening agent is preferably incorporated in the grease in an amount such that the resulting viscosity developed when incorporated in the grease reaches the grade of No. 1 to No. 3, preferably from No. 1 to No. 2 as defined in NLGI. In this arrangement, the grease can be provided with a fluidity suitable for the present invention.

The foregoing grease may contains various additives incorporated therein so far as the effect of the present invention cannot be impaired. For example, an oxidation inhibitor or rust preventive to be incorporated in ordinary bearing greases may be incorporated in the foregoing grease in a proper amount.

The preparation of the foregoing grease can be accomplished by any known method. For example, a method may be used which includes the steps of adding a thickening agent to a base oil, heating the mixture with stirring, allowing the resulting semisolid material to cool, optionally adding various additives to the semisolid material, and then uniformly kneading the mixture by means of a roll mill or the like. The various conditions such as heating temperature and stirring and kneading time can be properly predetermined by the base oil, thickening agent and additives used.

The rolling bearing according to the present invention is not limited in its structure or configuration. However, by forming the rolling bearing such that the radius of curvature of the groove on the inner ring is from 52% to 56% of the diameter of the rolling body and the radius of curvature of the groove on the outer ring is from 54% to 58% of the rolling body, the low temperature torque properties of the rolling bearing can be further improved.

FIG. 1 is a sectional view of an embodiment of a deep groove ball bearing. The ball bearing is formed such that the curvature of a inner ring groove 3 formed on an outer periphery of an inner ring 2 has a radius R1 of from 0.52 to 0.56 times the diameter D of a ball 1 as a rolling body while the curvature of a outer ring groove 5 formed on an inner periphery of an outer ring 4 has a radius R2 of from 0.54 to 0.58 times the diameter D of the ball 1.

By thus defining the rolling body and the groove on the inner and outer rings, the lubricant can easily enter into the gap between the rolling body and the inner and outer rings, thereby making it possible to lower the torque of the bearing.

EXAMPLES

The present invention will be further described in the following examples, but the present invention should not be construed as being limited thereto.

Examples 1–7; Comparative Examples 1–5
(Preparation of Grease)

Examples 1–7; Comparative Examples 1, 4 and 5

To the various fluorine-based oils having chemical structures of Kinds 1 to 4 (Kinds 1 to 3 are according to the present invention) set forth in Table 1 and dynamic viscosities set forth in Table 4 were each added particulate PTFE (average particle diameter: 0.2 μm). The mixtures thus obtained were each heated with stirring to obtain a semisolid matter. The semisolid matter thus obtained was allowed to cool, and then passed through a roll mill to obtain a grease. No rust preventive was added.

Comparative Example 2

A synthetic hydrocarbon oil (Kind 5 in Table 1) mixed with diisocyanate and the same synthetic hydrocarbon oil mixed with amine were reacted, and then heated with stirring to obtain a semisolid matter. To the semisolid matter was then added an amine-based oxidation inhibitor dissolved in the synthetic hydrocarbon oil. The mixture was thoroughly stirred, allowed to cool, mixed with a rust preventive, and then passed through a roll mill to obtain a grease.

Comparative Example 3

To an ester-based synthetic oil (Kind 6 in Table 1) was added a lithium soap. The mixture was then heated with stirring to obtain a semisolid matter. To the semisolid matter thus obtained was then added an amine-based oxidation inhibitor dissolved in the same ester-based synthetic oil. The mixture was thoroughly stirred, allowed to cool, mixed with a rust preventive, and then passed through a roll mill to obtain a grease.

(Low Temperature Torque Test-1)

Three kinds of testing bearings formed by arranging the radius of curvature of the groove on the inner and outer rings in deep groove ball bearing (inner diameter φ: 8 mm; outer diameters φ: 16 mm; width: 4 mm) with steel shield plate as set forth in Table 3 were used. The various greases contains formulations as set forth in Table 4 were each filled in these rolling bearings to occupy the bearing space by 30%. These rolling bearings were each operated at 1,800 rpm for 30 seconds, allowed to stand in a −40° C. constant temperature tank for 4 hours, and then operated at an inner ring rotary speed of 100 rpm for 3 minutes during which the dynamic torque was measured.

When the dynamic torque was not greater than 80 kgf·cm, it was evaluated "A" (very good). When the dynamic torque was not greater than 100 kgf·cm, it was evaluated "B" (good). When the dynamic torque exceeds 100 kgf·cm, it was evaluated "C" (bad). The results are set forth in Table 4. The foregoing test was effected three times.

(High Temperature Durability Test)

The various greases having formulations as set forth in Table 4 were each filled in a deep groove ball bearing with steel shield plate (inner diameters φ: 12 mm; outer diameter φ: 21 mm; width: 5 mm) to occupy the bearing space by 35%. The bearing was continuously operated at a bearing temperature of 180° C., an inner ring rotary speed of 100 rpm and an axial load of 5 kgf. The durability test was effected with 1,000 hours as target. When the electric current flowing through the motor for rotating the bearing reached twice the initial value, the life of the bearing was regarded as having expired.

The foregoing test was effected three times. The results are set forth in Table 4. In the table, the symbol "A" indicates that the electric current flowing through the motor falls below twice the initial value even after 1,000 hours. The symbol "C" indicates that the life of the bearing expires in less than 1,000 hours. These symbols are with detailed figures of hour.

TABLE 1

| Kind of base oil | |
|---|---|
| Kind 1 | $CF_3O-(CF_2O)_m-(CF_2O)_n-CF_3$  m/n < 1 |
| Kind 2 | $CF_3O-(CF_2CF_2O)_m-(CF_2O)_n-CF_3$  m/n > 1 |
| Kind 3 | $F-(CF_2CF_2CF_2O)_m-CF_2CF_3$ |
| Kind 4 | $CF_3CF_2CF_2O-(CFCF_2O)_mCF_2CF_3$ |
| | $\quad\quad\quad\quad\quad\quad\quad\quad\;\; |$ |
| | $\quad\quad\quad\quad\quad\quad\quad\quad CF_3$ |

TABLE 1-continued

Kind of base oil

Kind 5
$$H-(CH_2-CH)_n-H$$
$$|$$
$$R$$

Kind 6
$$CH_2OOCR$$
$$|$$
$$RCOOCH_2-C-CH_2OOCR$$
$$|$$
$$CH_2OOCR$$

TABLE 2

Formulation of thickening agent

| Kind 1 | PTFE |
|---|---|
| Kind 2 | Diurea |
| Kind 3 | Lithium soap |

TABLE 3

Radius of curvature* of groove on inner and outer rings

| Kind | Groove on inner ring | Groove on outer ring |
|---|---|---|
| Kind 1 | 51.5 | 53.5 |
| Kind 2 | 52.5 | 54.0 |
| Kind 3 | 56.0 | 58.0 |

*% Ratio to ball diameter

Figure 2:
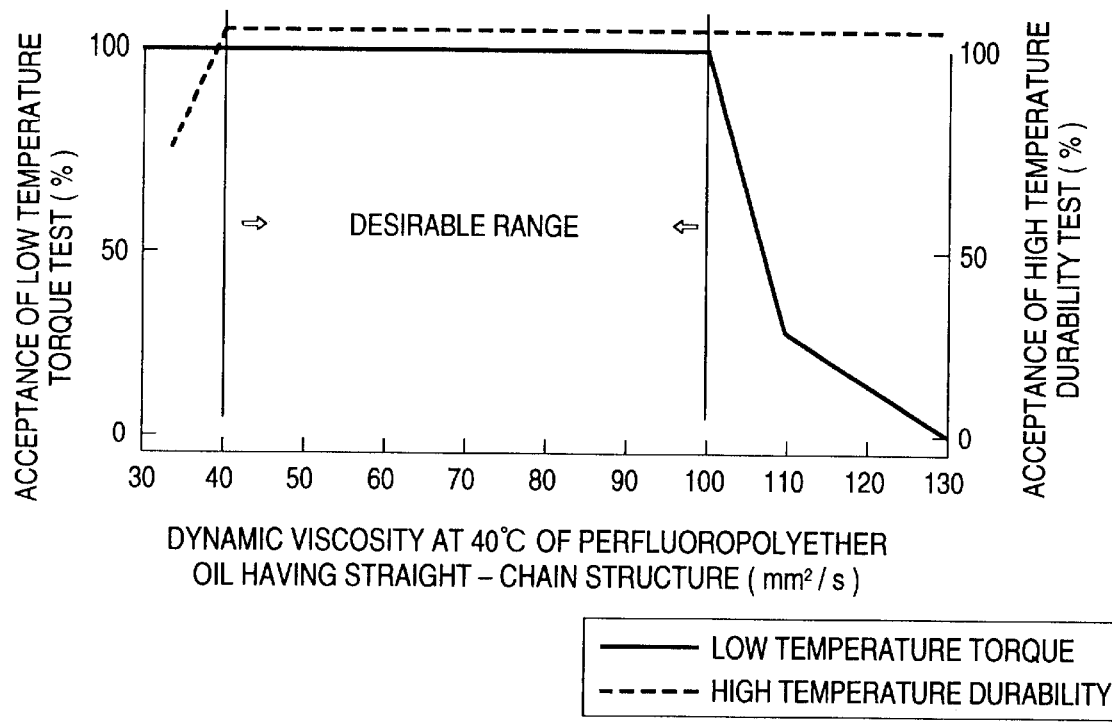
FIG. 2 is a graph illustrating the relationship between the dynamic viscosity of a perfluoropolyether oil having a straight-chain structure and the low temperature torque properties and high temperature durability of the bearing.

It can be seen in Table 4 that the filling of a grease containing a perfluoropolyether oil having a straight-chain structure having a dynamic viscosity of from 40 to 160 mm²/s at 40° C. as a base oil and a particulate fluororesin as a thickening agent makes it possible to obtain a bearing excellent both in low temperature torque properties and high temperature durability as shown in Examples 1 to 7. The relationship between the dynamic viscosity of the base oil and the low temperature torque properties and high temperature durability of the bearing is shown in FIG. 2.

Further, as shown in Examples 6 and 7, by specifying the radius of curvature of the groove on the inner and outer rings, the low temperature torque properties of the bearing can be improved.

Example 9

(Preparation of Grease)

To the same perfluoropolyether oil as used in Example 1 were each added particulate PTFE's having an average particle diameter of 0.2 μm, 0.15 μm and 0.07 μm. These mixtures were each heated with stirring to obtain a semisolid matter. The semisolid matter thus obtained was allowed to cool, and then passed through a roll mill to obtain a grease. No rust preventive was added.

The foregoing various greases were each filled in a deep groove ball bearing (inner diameter φ: 6 mm; outer diameter φ: 15 mm; width: 5 mm) with steel shield plate to occupy the bearing space by 30%. The bearing was operated at 1,800 rpm for 30 seconds, allowed to stand in a 25° C. constant temperature tank for 4 hours, and then operated at an inner ring rotary speed of 4 to 8 rpm. During the last operation, the torque of the bearing was measured. The torque was evaluated relative to that of Example 1 as 1. The results of the test are shown in FIG. 3.

TABLE 4

Examples 1 to 7

| | Ex. 1 | Ex. 2 | Ex. 3 | Ex. 4 | Ex. 5 | Ex. 6 | Ex. 7 |
|---|---|---|---|---|---|---|---|
| Base oil | kind 1 | kind 2 | kind 3 | kind 1 | kind 1 | kind 1 | kind 1 |
| Dynamic Viscosity of base oil mm²/sec (40° C.) | 90 | 85 | 65 | 100 | 50 | 90 | 90 |
| Thickening agent | kind 1 | kind 1 | kind 1 | kind 1 | kind 1 | kind 1 | kind 1 |
| Resulting viscosity | NO. 1 | NO. 1 | NO. 1 | NO. 1 | NO. 1 | NO. 1 | NO.1 |
| Radius of curvature of inner and outer rings | kind 1 | kind 1 | kind 1 | kind 1 | kind 1 | kind 2 | kind 2 |
| Low Temp. torque test | B | B | B | B | B | A | A |
| test | B | B | B | B | B | A | A |
| | B | B | B | B | B | A | A |
| High Temp. durability | A: 1000 hr | A: 1000 hr | A: 1000 hr | A: 1000 hr | A: 1000 hr | A: 1000 hr | A: 1000 hr |
| test | A: 1000 hr | A: 1000 hr | A: 1000 hr | A: 1000 hr | A: 1000 hr | A: 1000 hr | A: 1000 hr |
| | A: 1000 hr | A: 1000 hr | A: 1000 hr | A: 1000 hr | A: 1000 hr | A: 1000 hr | A: 1000 hr |

Example 8 and Comparative Examples 1 to 4

| | Example 8 | Comp. Ex. 1 | Comp. Ex. 2 | Comp. Ex. 3 | Comp. Ex. 4 |
|---|---|---|---|---|---|
| Base oil | kind 2 | kind 4 | kind 5 | kind 6 | kind 2 |
| Dynamic Viscosity of base oil mm²/sec (40° C.) | 110 | 80 | 50 | 33 | 35 |
| Thickening agent | kind 1 | kind 1 | kind 2 | kind 3 | kind 1 |
| Resulting viscosity | NO. 2 | NO. 2 | NO. 2 | NO. 2 | NO. 2 |
| Radius of curvature of inner and outer rings | kind 1 | kind 1 | kind 1 | kind 1 | kind 1 |
| Low Temp. torque test | A | C | A | A | A |
| | C | C | A | A | A |
| | C | C | A | A | A |
| High Temp. durability test | A: 1000 hr | A: 1000 hr | C: 541 hr | C: 429 hr | A: 1000 hr |
| | A: 1000 hr | A: 1000 hr | C: 310 hr | C: 367 hr | A: 1000 hr |
| | A: 1000 hr | A: 1000 hr | C: 253 hr | C: 195 hr | C: 952 hr |

It can be seen in FIG. 3 that when the average particle diameter of particulate PTFE is not more than 0.1 μm, the relative torque falls below 1, making it possible to improve the low temperature torque properties of the bearing. Preferably, the average particle diameter of particulate PTFE is not more than 0.07 μm.

As mentioned above, the rolling bearing according to the present invention comprises a grease filled therein, said grease comprising a perfluoropolyether oil having a straight-chain structure having a specific dynamic viscosity as a base oil and a particulate fluororesin such as PTFE as a thickening agent, to exhibit improvement both in low temperature torque properties and high temperature durability. Accordingly, the rolling bearing according to the present invention can be used as a rolling bearing which can satisfy stable bearing properties between low temperature and high temperature for use in automobile fuel jet controller such as apparatus for controlling the speed or idle rotation, exhaust gas recycling apparatus and electronic throttle controller.

What is claimed is:

1. A ball bearing comprising:

an outer ring having an outer ring groove formed on an inner periphery thereon;

an inner ring having an inner ring groove formed on an outer periphery thereon;

a plurality of rolling elements disposed between said outer ring groove and said inner ring groove; and a grease filled in a space formed between the inner periphery of said outer ring and the outer periphery of said inner ring;

wherein said grease comprising a perfluoropolyether oil having a straight-chain structure having a dynamic viscosity of from 40 to 160 mm$^2$/s at 40° C. as a base oil and a particulate fluororesin as a thickening agent, and said ball bearing is used for a fuel jet controlling apparatus in an automotive vehicle.

2. The ball bearing according to claim 1, wherein said particulate fluororesin has an average diameter of not more than 0.1 μm.

3. The ball bearing according to claim 2, wherein said particulate fluororesin has an average diameter of not more than 0.07 μm.

4. The ball bearing according to claim 1, wherein said a thickening agent is incorporated in said grease in an amount such that the resulting viscosity developed when incorporated in the grease reaches the grade of No. 1 to No. 3 as defined in NLGI.

5. The ball bearing according to claim 1, wherein a curvature of the inner ring groove is from 0.52 to 0.56 times a diameter of said rolling element and a curvature of the outer ring groove is from 0.54 to 0.58 times a diameter of said rolling element.

6. The ball bearing according to claim 1, wherein said perfluoropolyether oil contains at least one of (1) $CF_3O-(CF_2CF_2O)_m-(CF_2O)_n-CF_3$ (m/n<1), (2) $CF_3O-(CF_2CF_2O)_m-(CF_2O)_n-CF_3$ (m/n>1), and (3) $F-(CF_2CF_2CF_2O)_n-CF_2CF_3$.

7. The ball bearing according to claim 1, wherein said perfluoropolyether oil has the dynamic viscosity of from 40 to 100 mm$^2$/s at 40° C.

8. The ball bearing according to claim 1, wherein said ball bearing is a deep groove ball bearing.

* * * * *